(12) United States Patent
Rodriguez et al.

(10) Patent No.: US 6,294,081 B1
(45) Date of Patent: *Sep. 25, 2001

(54) HYDROPROCESSING WITH CATALYTIC SILICOALUMINOPHOSPHATES HAVING AN AEL STRUCTURE

(75) Inventors: Javier Agundez Rodriguez; Joaquin Perez Pariente, both of Madrid; Antonio Chica Lara, Jaen; Avelino Corma Canos, Valencia, all of (ES); Ian A. Cody; William J. Murphy, both of Baton Rouge, LA (US); Sandra J. Linek, East Hanover, NJ (US)

(73) Assignee: ExxonMobil Chemical Patents, Inc., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/315,420

(22) Filed: May 20, 1999

Related U.S. Application Data

(60) Provisional application No. 60/086,681, filed on May 26, 1998.

(51) Int. Cl.$^7$ .................................................. C10G 47/04
(52) U.S. Cl. .................... 208/111.01; 208/109; 208/110; 208/27; 208/28; 208/111.3; 208/111.35; 208/111.15
(58) Field of Search .................................. 208/109, 110, 208/111.01, 27, 28, 111, 3, 111.35, 111.15

(56) References Cited

U.S. PATENT DOCUMENTS

| | | |
|---|---|---|
| 4,440,871 | 4/1984 | Lok et al. ............................. 502/214 |
| 4,499,315 | 2/1985 | Garska et al. ....................... 585/415 |
| 4,512,875 | 4/1985 | Long et al. .......................... 208/114 |
| 4,683,050 | 7/1987 | Ward .................................... 208/110 |
| 4,724,066 | 2/1988 | Kirker et al. ......................... 208/114 |
| 4,734,185 | 3/1988 | Pellet et al. .......................... 208/114 |
| 4,791,083 | 12/1988 | Pellet et al. .............................. 502/64 |
| 4,803,184 | 2/1989 | Long et al. .............................. 502/63 |
| 4,818,739 | 4/1989 | Gortsema et al. ..................... 502/67 |
| 4,826,804 | 5/1989 | Shamshoum ......................... 502/214 |
| 4,857,495 | 8/1989 | Gortsema et al. .................... 502/214 |
| 4,859,311 | 8/1989 | Miller ..................................... 208/89 |
| 4,859,312 | 8/1989 | Miller ................................... 208/111 |
| 4,859,314 | 8/1989 | Pellet et al. .......................... 208/114 |
| 4,880,760 | 11/1989 | Pellet et al. .............................. 502/67 |
| 4,906,351 | 3/1990 | Pellet et al. ........................... 208/111 |
| 4,913,798 | 4/1990 | Gortsema et al. ................... 208/111 |
| 4,914,067 | 4/1990 | Pellet et al. .............................. 502/63 |
| 4,921,594 | 5/1990 | Miller ..................................... 208/58 |
| 4,943,424 | 7/1990 | Miller ................................... 423/328 |
| 4,960,504 | 10/1990 | Pellet et al. ........................... 208/411 |
| 4,976,846 | 12/1990 | Long et al. .......................... 208/114 |
| 4,992,160 | 2/1991 | Long et al. .......................... 208/111 |
| 5,087,347 | 2/1992 | Miller ..................................... 208/46 |
| 5,096,684 | 3/1992 | Guth et al. .......................... 423/306 |
| 5,139,647 | 8/1992 | Miller ................................... 208/100 |
| 5,149,421 | 9/1992 | Miller ................................... 208/114 |
| 5,185,310 | 2/1993 | Degnan et al. ...................... 502/214 |
| 5,208,005 | 5/1993 | Miller ................................... 423/792 |
| 5,300,277 | 4/1994 | Kresge et al. ....................... 423/703 |
| 5,360,474 | 11/1994 | Lauth et al. .......................... 406/402 |
| 5,413,695 | 5/1995 | Miller ..................................... 208/29 |
| 5,472,594 | 12/1995 | Tsang et al. ......................... 208/114 |
| 5,486,284 | 1/1996 | Degnan et al. ...................... 208/120 |
| 5,723,716 | 3/1998 | Brandes et al. ...................... 585/734 |
| 5,730,858 | 3/1998 | Olivier et al. .......................... 208/28 |
| 5,770,042 | 6/1998 | Galperin et al. ....................... 208/65 |
| 5,804,058 | 8/1998 | Grandvallet et al. ................ 208/171 |
| 5,831,139 | 11/1998 | Schmidt et al. ...................... 585/315 |
| 5,833,837 | 11/1998 | Miller ..................................... 208/80 |
| 5,879,655 | 3/1999 | Miller et al. ......................... 423/702 |
| 5,888,378 | 3/1999 | Kowalski ............................. 208/114 |
| 5,989,518 | 11/1999 | Tannous et al. ..................... 423/717 |

FOREIGN PATENT DOCUMENTS 146384   6/1990   (EP) .

OTHER PUBLICATIONS

K. J. Chao, et al., *Silicon species in a SAPO–5 molecular sieve*, Applied Catalysis, 72, (1991) 39–49—no month.

M. J. Franco, et al., *Study of SAPO–5 obtained from surfactant–containing gels*: Part. 1. Crystallization parameters and mechanism of Si substitution, Zeolites 15:117–123 (1995)—no month.

J. Agundez, et al., *Synthesis of SAPOs from Microemulsions*: A General Method to Obtain Materials with Enhanced Catalytic Activity (Abstract), 11th International Zeolite Conference RP25, 1996—no month.

J. Agundez, et al., *Synthesis of SAPOs from Microemulsions*: A General Method to Obtain Materials with Enhanced Catalytic Activity, Discussions on Zeolite and Microporous Materials 1997, Hanrimwon Publishing Co., Seoul, Korea—no month.

P. Meriaudeau, et al., *Isomorphous substitution of silicon in the AlPO4 framework with AEL structure*: n–octane hydroconversion, Microporous and Mesoporous Materials 22 (1998) 435–449—no month.

*Primary Examiner*—Nadine Preisch

(57) ABSTRACT

Disclosed are silicoaluminophosphates (SAPOs) having unique silicon distributions, a method for their preparation and their use as catalysts for the hydroprocessing of hydrocarbon feedstocks. More particularly, the new SAPOs have a high silica:alumina ratio, and are prepared from microemulsions containing surfactants.

22 Claims, 12 Drawing Sheets

Figure 1

| P | Al | P | Al | P | Al | P | Al | P | Al |
|---|----|---|----|---|----|---|----|---|----|
| Al | P | Al | Si | Al | P | Al | P | Al | P |
| P | Al | P | Al | P | Al | Si | Al | P | Al |
| Al | P | Al | P | Al | Si | Si | Si | Al | P |
| P | Al | P | Al | P | Al | Si | Al | P | Al |
| Al | P | Al | Si | Al | P | Al | P | Al | P |
| P | Al | Si | Si | Si | Al | P | Al | P | Al |
| Al | P | Al | Si | Si | Si | Al | P | Al | P |
| P | Al | Si | Si | Si | Al | P | Al | P | Al |
| Al | P | Al | Si | Si | Si | Al | P | Al | P |
| P | Al | Si | Si | Si | Al | P | Al | P | Al |
| Al | P | Al | Si | Al | P | Al | P | Al | P |
| P | Al | P | Al | P | Al | P | Al | P | Al |
| Al | P | Al | P | Al | P | Al | P | Al | P |

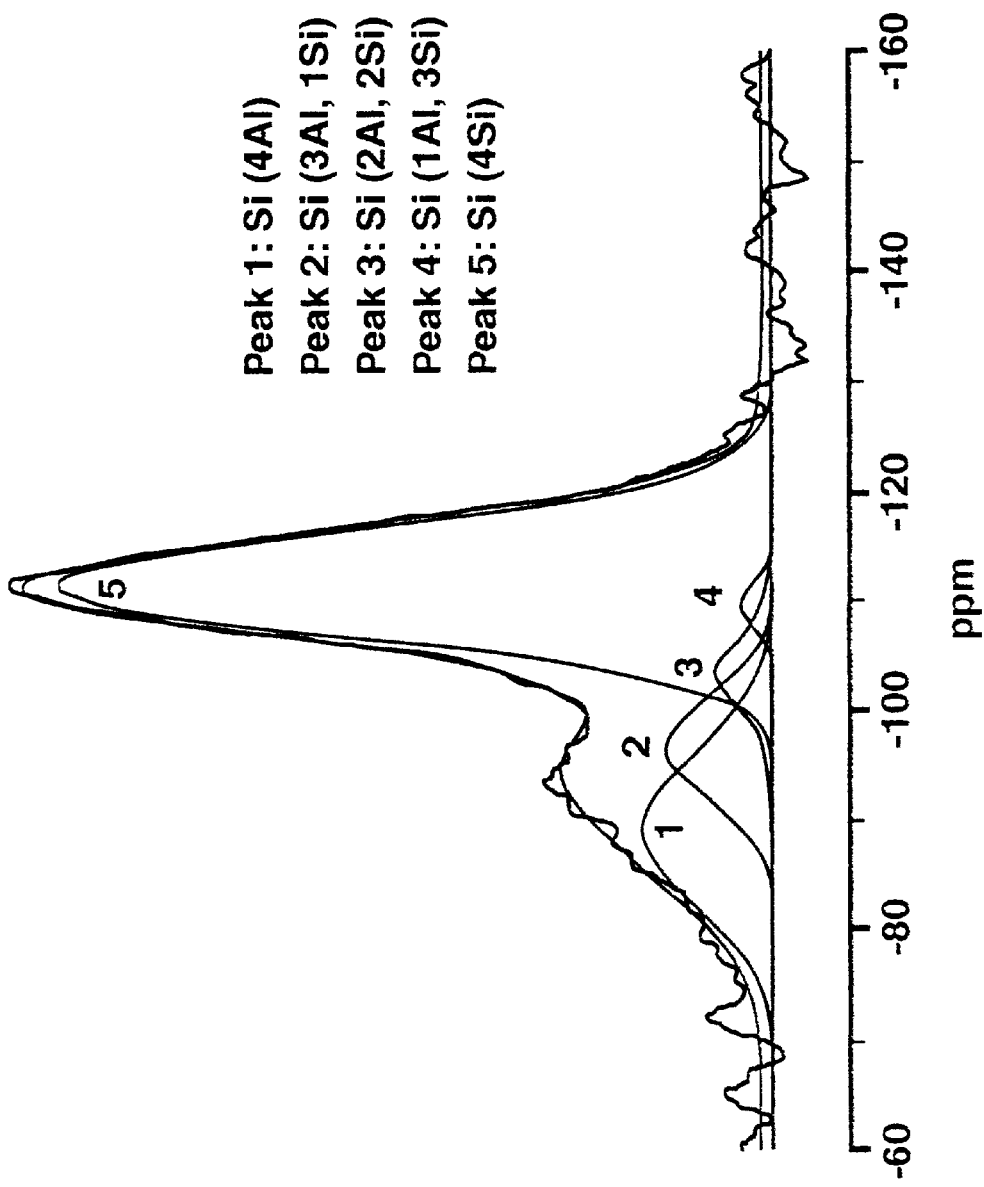
FIGURE 5-A
Simulation of ²⁹Si MAS NMR spectrum of sample 1-a
Peak 1: Si (4Al)
Peak 2: Si (3Al, 1Si)
Peak 3: Si (2Al, 2Si)
Peak 4: Si (1Al, 3Si)
Peak 5: Si (4Si)

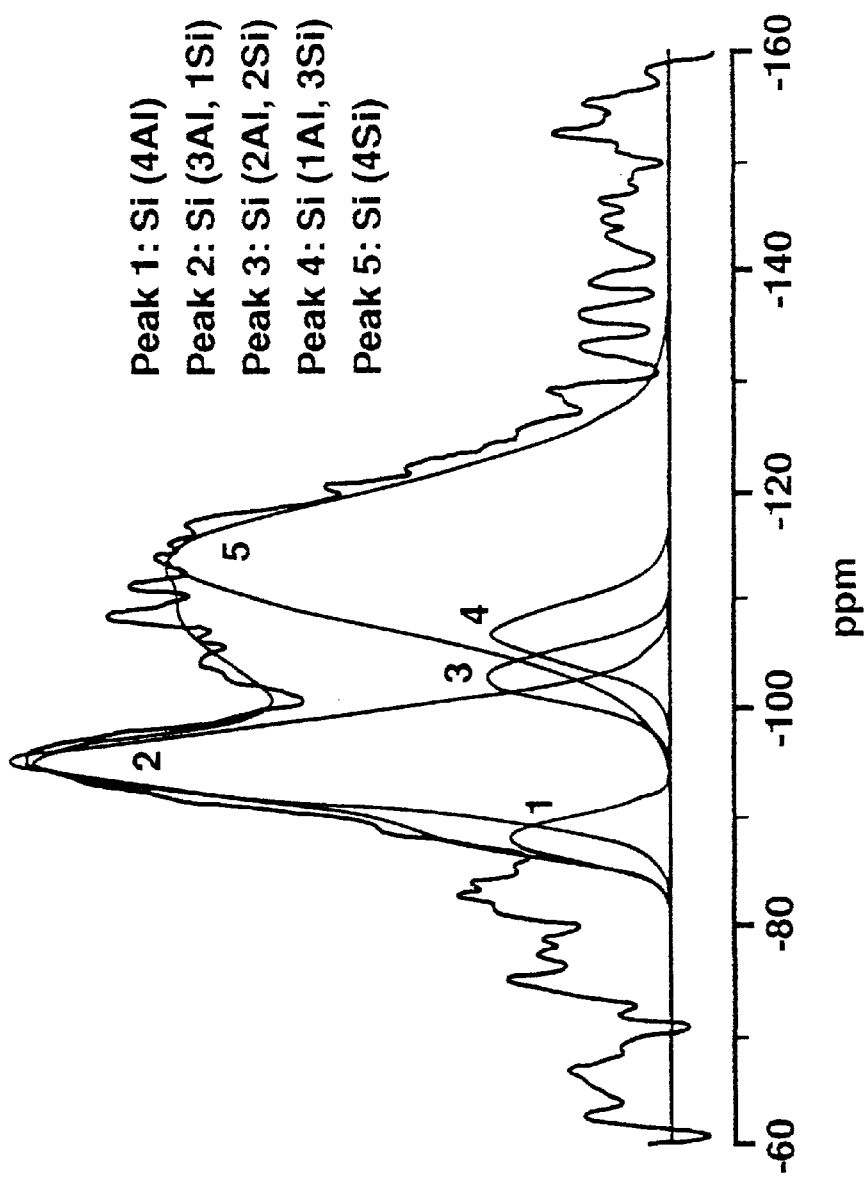

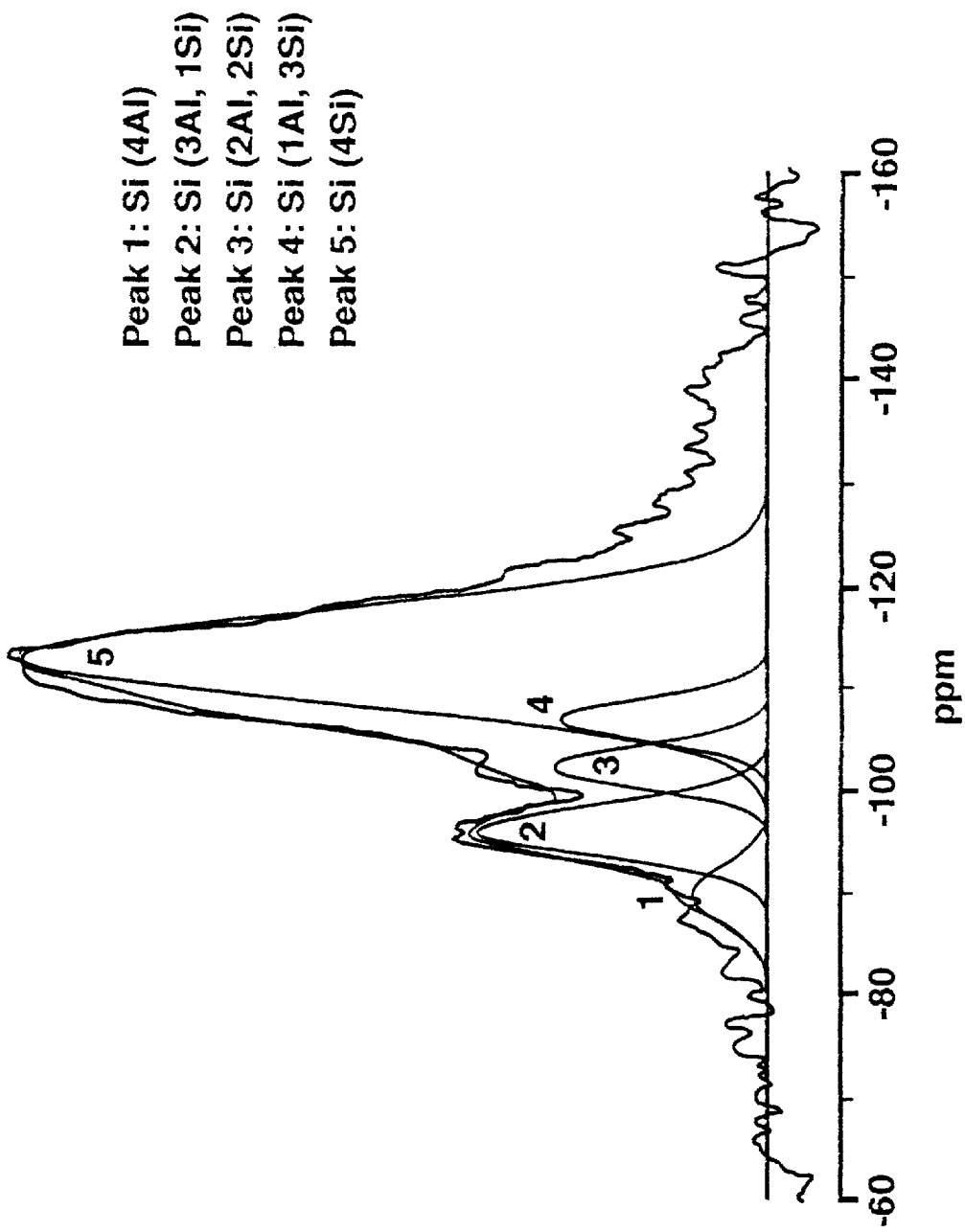

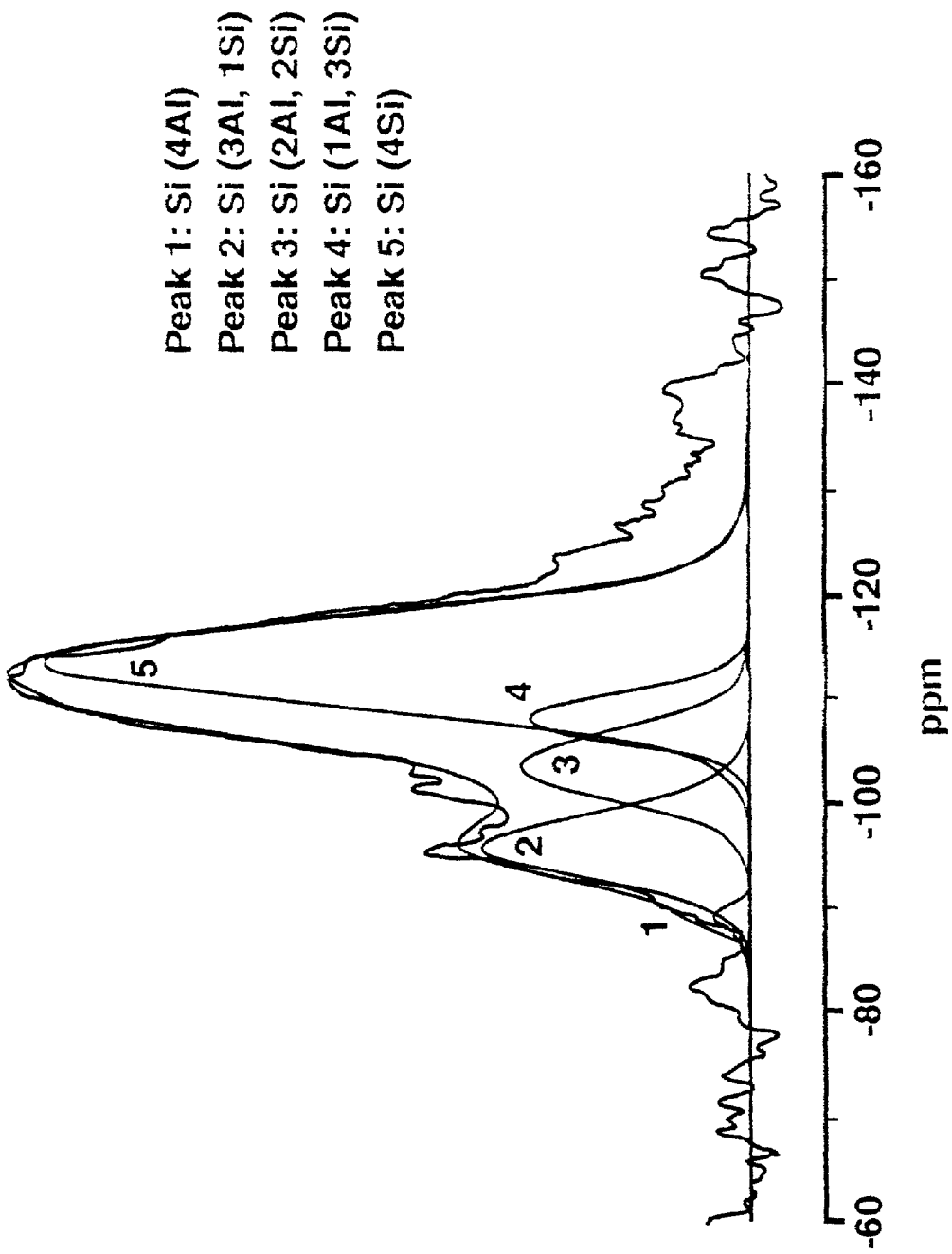

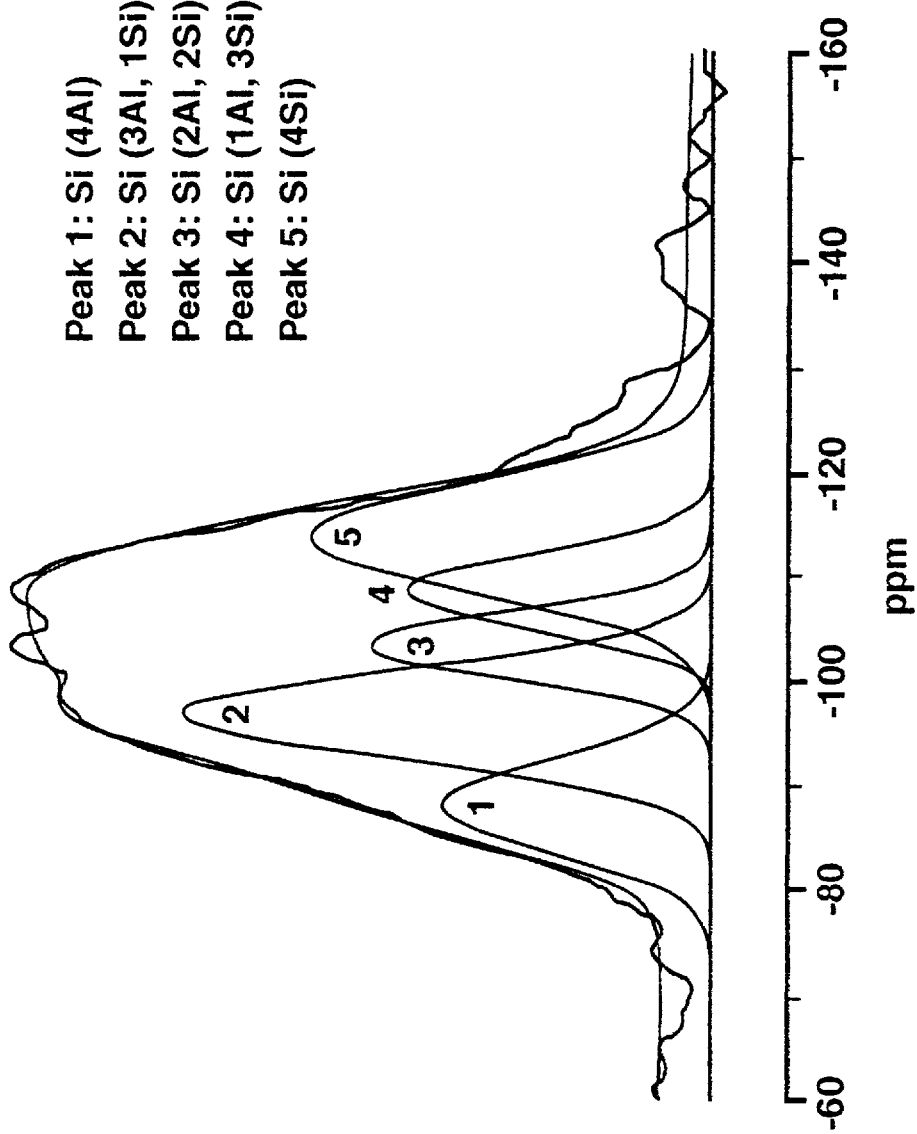
FIGURE 5-E
Simulation $^{29}$Si MAS NMR spectrum of sample 2-a
Peak 1: Si (4Al)
Peak 2: Si (3Al, 1Si)
Peak 3: Si (2Al, 2Si)
Peak 4: Si (1Al, 3Si)
Peak 5: Si (4Si)

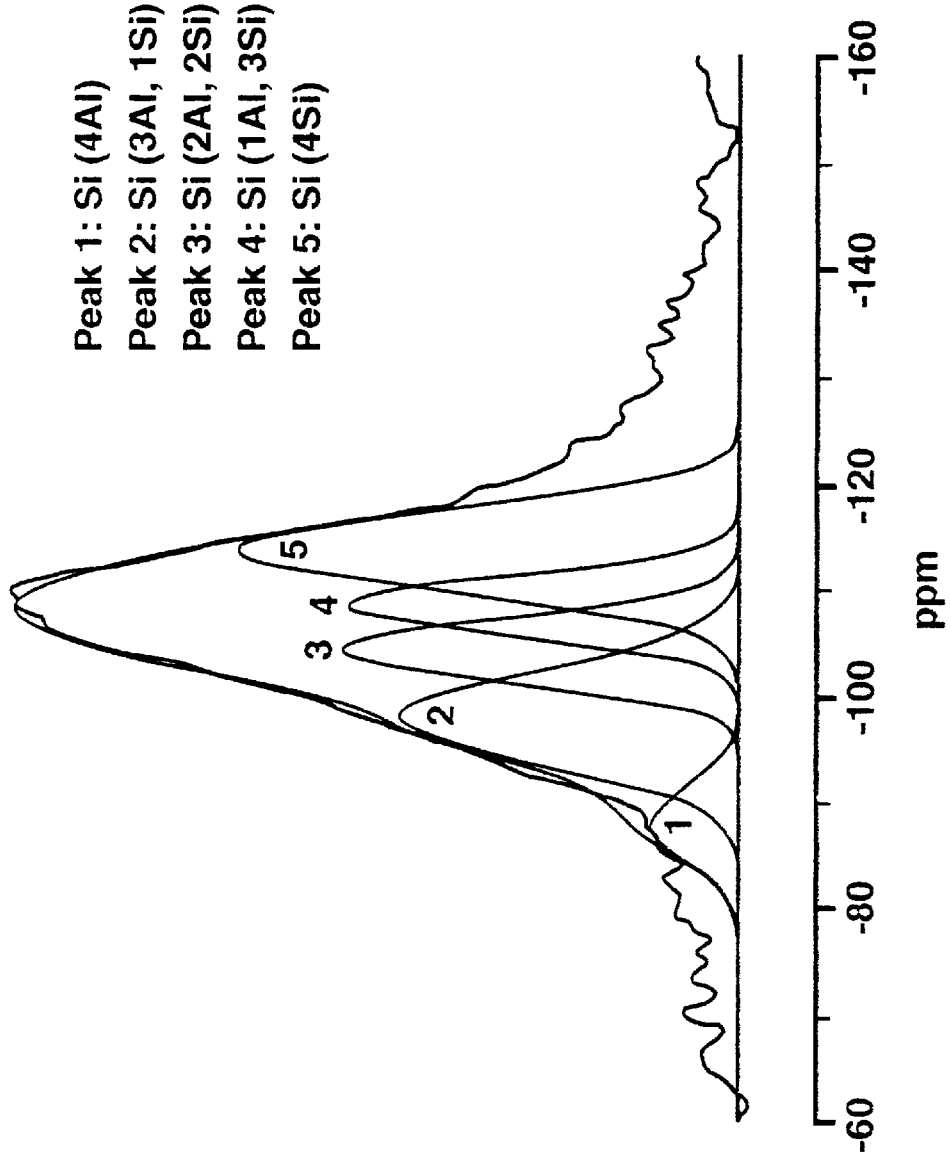

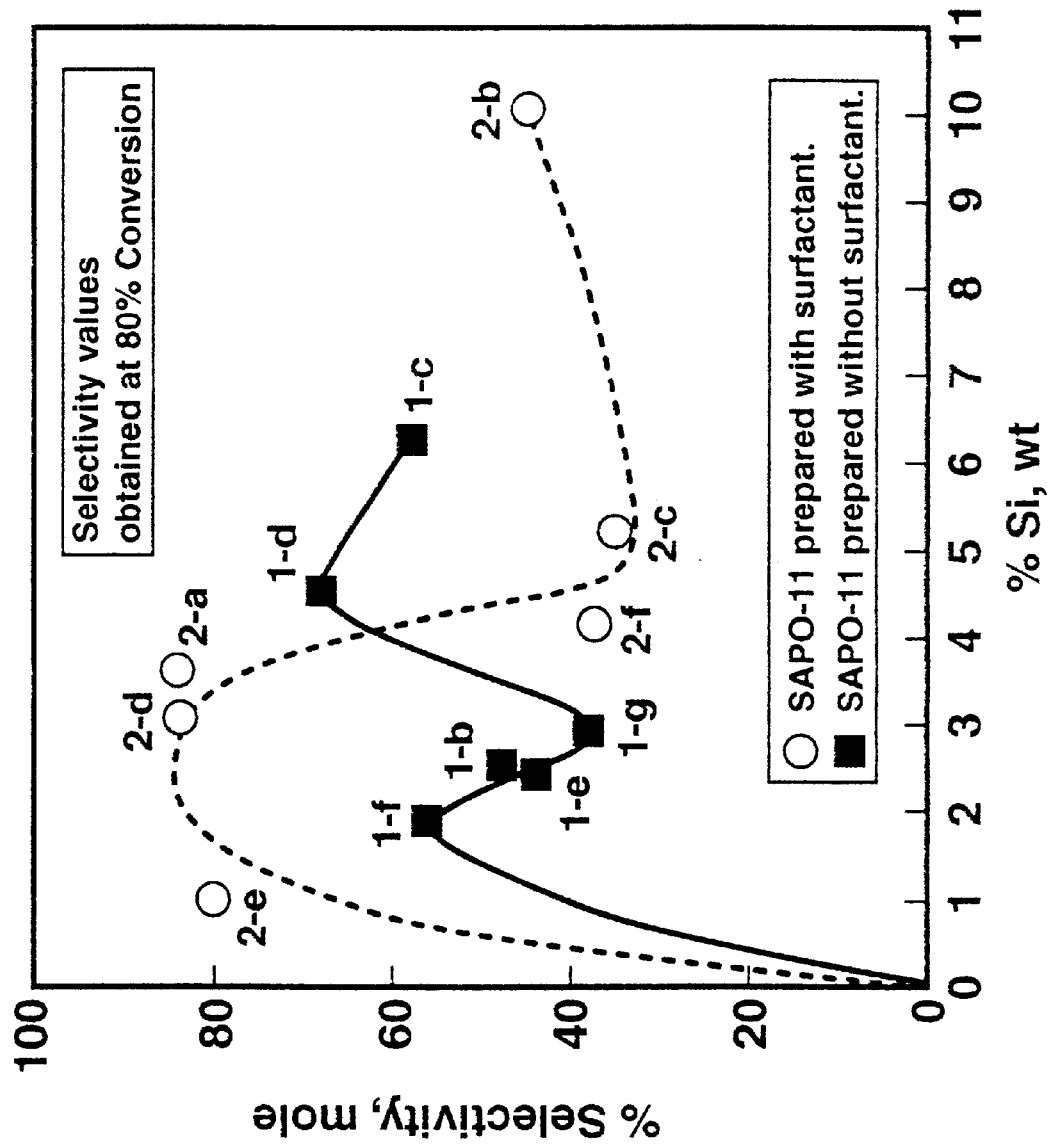

HYDROPROCESSING WITH CATALYTIC SILICOALUMINOPHOSPHATES HAVING AN AEL STRUCTURE

This application claims the benefit of U.S. provisional application Ser. No. 60/086,681, filed on May 26, 1998.

FIELD OF THE INVENTION

This invention relates to using silicoaluminophosphates ("SAPO"s) having unique silicon distributions and their use as catalysts for the catalytic cracking and hydroprocessing of hydrocarbon feedstocks. More particularly, the SAPOs have a high silica:alumina ratio, and are prepared from microemulsions containing surfactants.

BACKGROUND OF THE INVENTION

Conventional microporous crystalline silicoaluminophosphates such as SAPO-11 may be prepared by hydrothermal crystallization of silicoaluminophosphate gels containing a molecular structure-forming template. SAPOs are members of a class known as non-zeolitic molecular sieves. SAPO molecular sieves have a framework of $AlO_4$, $SiO_4$ and $PO_4$ tetrahedra linked by oxygen atoms. The negative charge in the network is balanced by the inclusion of exchangeable protons or cations such as protonated amines or alkylamonium. The interstitial spaces of channels formed by the crystalline network enables SAPOs to be used as molecular sieves in a manner similar to zeolites, which are crystalline aluminosilicates.

More recently a new silicoaluminophosphates have been prepared that are isostructural with conventional SAPO-11, but having a dramatically higher silicon:aluminum ratio and appropriate silicon distribution. Such materials are prepared from microemulsions.

Conventional SAPOs may be used as catalysts in petroleum processing. For example, SAPO catalysts may be used in lubricating oil hydroconversion procedures, hydrocracking, dewaxing, and combinations thereof. Conventional SAPO catalysts may also be used in catalytic cracking processes such as fluid catalytic cracking ("FCC") processes.

There remains a need, though, for improved silicoaluminophosphates for use in hydrocarbon processing.

SUMMARY OF THE INVENTION

The invention is a method for catalytically dewaxing a hydrocarbon, comprising contacting the hydrocarbon under catalytic dewaxing conditions with a catalytically effective amount of a SAPO catalyst, the SAPO catalyst having a total silicon amount ranging from about 0.2 molar %, preferably about 4 molar %, and more preferably about 7 molar % to about 40 molar %, a total aluminum amount ranging from about 30 molar % to about 49.9 molar %, and a total phosphorus amount ranging from about 10 molar % to about 49.9 molar %, the molar percents being based on the total amount of aluminum, phosphorus, and silicon present in the composition, and the SAPO catalyst being isostructural with a SAPO-11 having the AEL structure and containing silicon, aluminum, and phosphorus, wherein (a) the silicon present in the SAPO catalyst is distributed among silicon sites, each site having a first, a second, a third, and a fourth nearest neighbor position, and each position being independently occupied by one atom selected from silicon and aluminum, and (b) the composition has a first number of silicon sites having silicon atoms in the four nearest neighbor positions (Si4Si), a second number of silicon sites having silicon atoms in three of the four nearest neighbor positions (Si3Si), and a third number of silicon sites having silicon atoms in two of the four nearest neighbor positions (Si2Si), wherein (i) the sum of the first, second, and third number of silicon sites ranges from about 10 to about 80 molar %, and (ii) the molar ratio of the sum of the third and second number of silicon sites to the first number of silicon sites ranges from about 0.7 to about 1.4, the molar % being based on the total number of silicon sites.

BRIEF DESCRIPTION OF THE DRAWINGS

FIG. 1 schematically illustrates the local arrangement of Si atoms in a SAPO framework.

FIG. 5 shows $^{29}Si$ MAS NMR result for the samples described herein. FIG. 5-a corresponds with sample 1-a, 5-b with sample 1-b, 5-c with sample 1-c, 5-d with sample 1-d, 5-e with sample 2-a, and 5-f with sample 2-b.

FIG. 7 shows the variation of n-hexane conversion selectivity with Si content for the samples described herein.

DETAILED DESCRIPTION OF THE INVENTION

Figure 2:
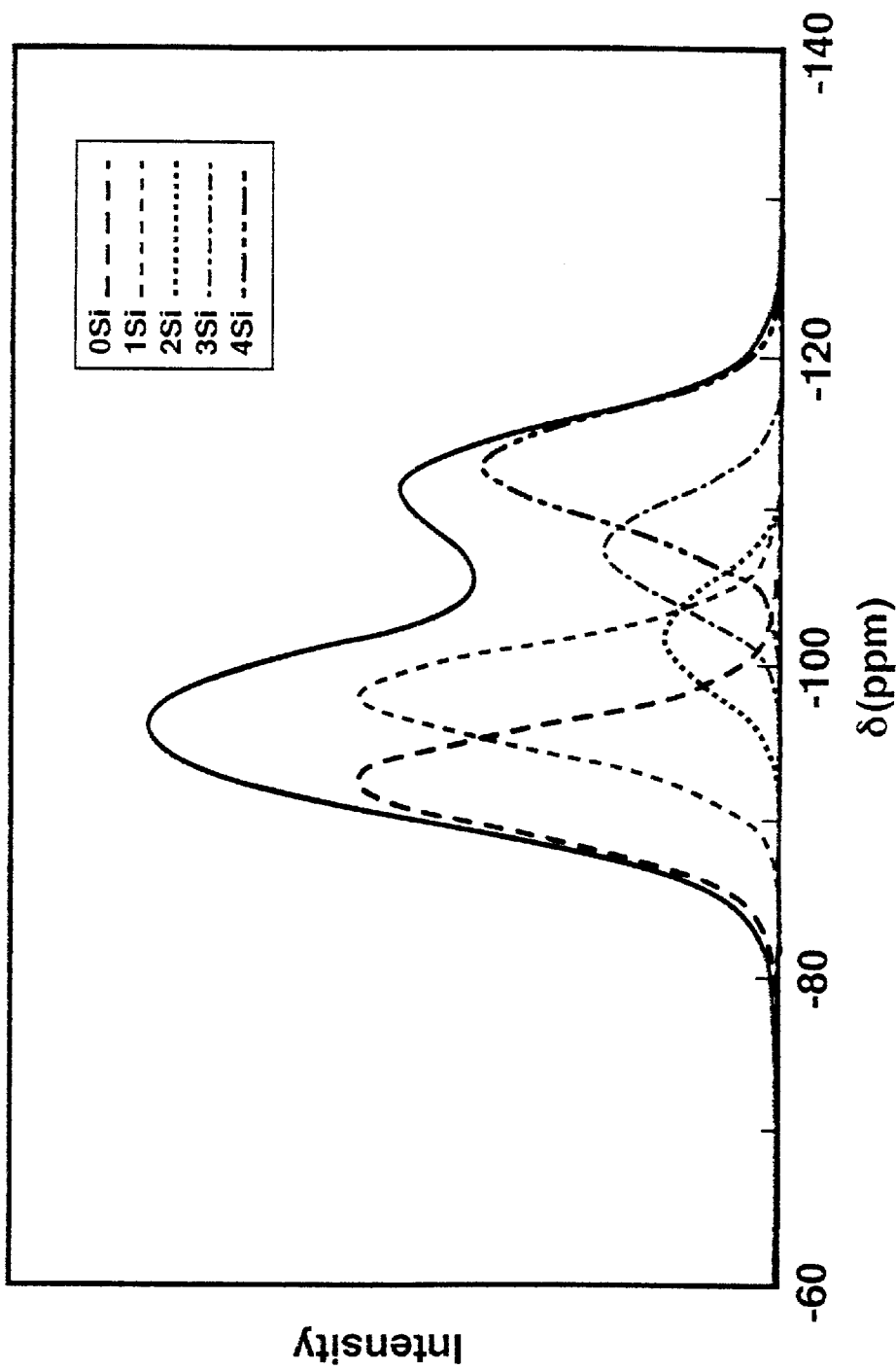
FIG. 2 is a simulated deconvolution of a $^{29}Si$ MAS NMR spectrum.
Figure 3:
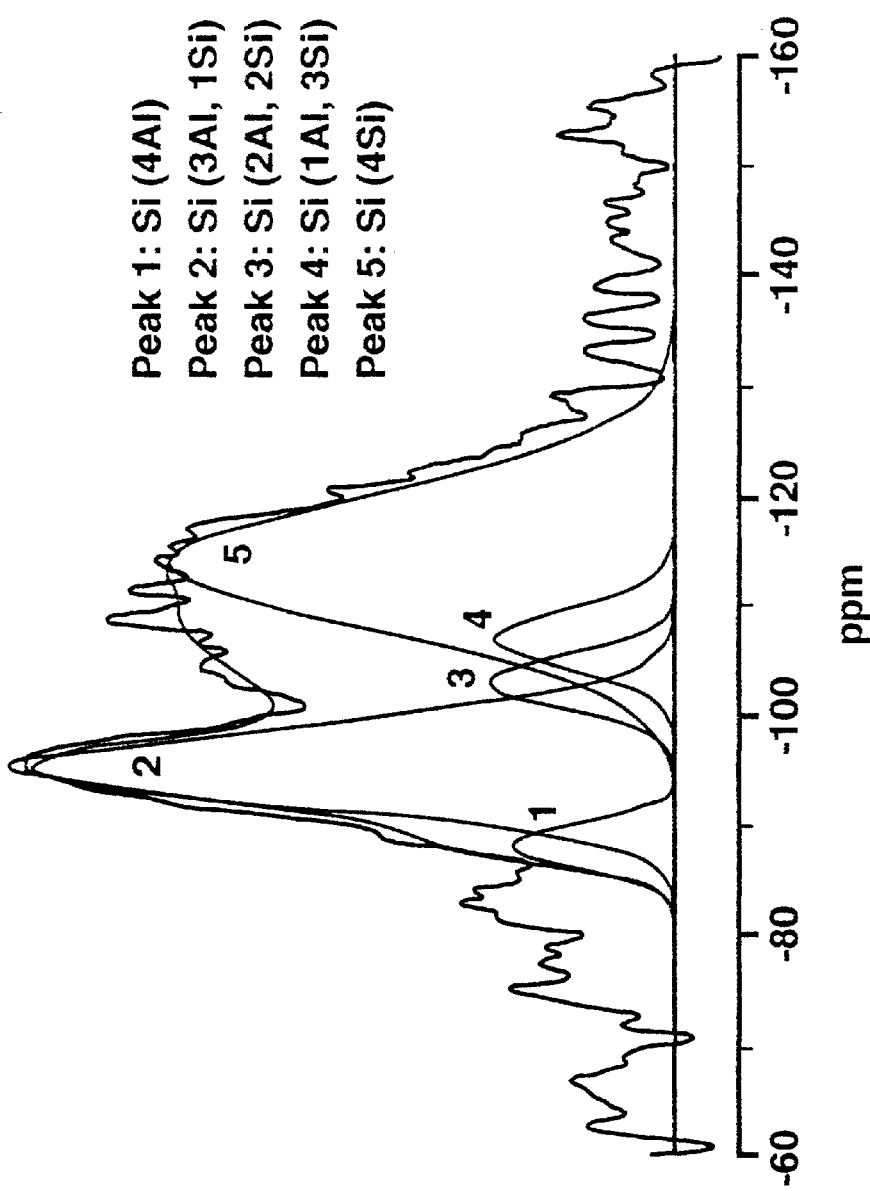
FIG. 3 is a deconvolution of a $^{29}Si$ MAS NMR spectrum of conventionally-prepared SAPO-11 with a 2.47 wt. % Si content.

This invention relates to a new SAPO having an AEL structure as defined in the "Atlas of Zeolite Structure Types," 4th Ed, by W. M. Meier, D. H. Olson and Ch. Baerlocher, Elsevier, 1996. The new SAPO is prepared by adding an aqueous solution of phosphoric acid to alumina. The mixture is stirred and an aqueous mixture of alcohol with a low solubility in water, such as n-hexanol, pentanol, butanol, and mixtures thereof, and a neutral or cationic surfactant, such as hexadecylamine, decylamine, hexadecyltrimethylammonium salt, and mixtures thereof is added to the mixture of phosphoric acid and alumina. To this mixture is added a silicon source material such as silicon alkoxide, and preferably tetraethylorthosilicate, and the resultant mixture stirred. The result gel may be calcined in order to form the SAPO materials of this invention. It has been discovered that such materials are effective catalysts for reaction such as lubricating oil hydroprocessing and catalytic cracking, including naphtha cracking. The new SAPO materials have much improved activity and selectivity over SAPOs having an AEL structure and prepared by methods not described in the current invention.

While not wishing to be bound, it is believed that the enhanced catalytic activity in these new SAPO materials results from modifying the synthesis of a silicon-substituted aluminophosphate by changing the composition of the synthesis mixture and the length of time taken to crystallize the product in order to modify the silicon distribution in the silicoaluminophosphate thus formed. The changed distribution of silicon is believed to have a major beneficial influence on the catalytic activity of the silicoaluminophosphate.

The following sections set forth the synthesis and use of the AEL-type SAPOs of this invention. Section A describes the molecular sieve synthesis processes, Section B described SAPO molecular sieve catalysts useful in the invention, Section C describes the physical differences between the SAPO materials of this invention and conventional SAPO-11, and Section D describes the use of the molecular sieve catalysts for hydrocarbon processing.

A. Synthesis of Preferred AEL-Type SAPO Molecular Sieves

When AEL-type molecular sieve materials are synthesized following the procedure described herein, the distribution of Si and therefore the total number and strength of acid sites is quite different, and much higher than those of previously reported forms of SAPO-11.

The preferred silicoaluminophosphate composition has the structure of AEL which corresponds to SAPO-11. The AEL structure is defined in the "Atlas of Zeolite Structure Types," 4th Ed, by W. M. Meier, D. H. Olson and Ch. Baerlocher, Elsevier, 1996. Although the preferred composition is isostructural with other AEL molecular sieve materials, it is a distinct molecular sieve composition because the silicon, aluminum, and phosphorus atoms present in the composition of this invention are not arranged the same way as in AEL-type SAPO molecular sieve. Those skilled in the art will recognize that two isostructural molecular sieves may be entirely different compositions having entirely different properties, depending on, for example, the nature and distribution of the constituent atoms. One such example involves isostructural synthetic ferrierites disclosed in U.S. Pat. Nos. 3,033,974, 3,966,883, 4,000,348, 4,017,590, and ZSM-35 U.S. Pat. No. 4,016,245.

The preferred molecular sieve compositions are physically different from other SAPOs having the AEL structure because the silicon atoms are distributed differently in the molecular sieve framework. The physical structure of the preferre composition (and its silicon distribution) is illustrated schematically in FIG. 1. While the actual structure is three dimensional and contains oxygen in addition to silicon, aluminum and phosphorus, the figure's atomic positions are represented on a two-dimensional dimensuional array and oxygen atoms are omitted for clarity. As is shown in the figure, each lattice site in the framework has four nearest neighbor lattice sites. In the compositions of this invention, as with all AEL-type SAPOs, a lattice site occupied by a silicon atoms, i.e., a "silicon site," ordinarily may not have a phosphorus atom as a nearest neighbor. The four next nearest neighbor lattice sites may therefore be occupied by one silicon and three aluminum atoms, two silicon and two aluminum atoms, three silicon and one aluminum atom, four silicon atoms, or four aluminum atoms, as shown in FIG. 1. As discussed, conventional AEL-type SAPOs with increased silicon concentration contain an undesirable high proportion of silicon atoms forming part of the interior of the silicon islands, i.e., silicon atoms having four silicon atoms nearest neighbors. Nevertheless, and while not wishing to be bound by any theory or model, the formation of silicon island is believed to be desirable, for the silicon atoms in the border of the island are believed to lead to a negative charge that, if balanced by protons, would produce materials with acid centers whose acid strength is higher than that of isolated Si sites with the four nearest neighbor lattice sites occupied by aluminum atoms.

The silicon atoms in the preferred composition are physically distributed so that the size of the silicon island, and therefore the concentration of Si atoms having four silicon as neighbors, is greatly reduced compared with other AEL-type SAPOs having the same total silicon concentration.

The molecular sieve compositions useful in this invention may be formed in accordance with conventional molecular sieve synthesis techniques from a silicoaluminophosphate gel having the formula

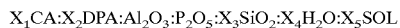

wherein $X_1$ ranges from about 0.001 to about 0.5, $X_2$ ranges from about 0.5 to 2, $X_3$ ranges from about 0.01 to about 3, $X_4$ ranges from about 4 to about 300, and $X_5$ ranges from about 0.1 to about 50.

Alumina, phosphoric acid, and water may be combined, and preferably agitated, for a time sufficient to form a uniform solution. The molar ratio of phosphoric acid to alumina is in the range specified in the previous paragraph. All the water or only a portion of the water required is combined with the alumina and the phosphoric acid. This portion is in the range 5–99% of total water, preferentially in the range 10–50%. A preferred temperature for the combination is 20° C., but temperatures in the range of about 4–70° C. are suitable as well. A template such as di-n-propylamine, diisopropylamine, dodecylamine or tetrabutylammonium hydroxide may then be added, followed by surfactant such as hexadecylamaine or decylamine, an alcohol such as hexanol, pentanol or butanol, and a silica source such as tetraethyl orthosilicate, tetramethyl orthosilicate or tetrabuthyl orthosilicate in order to complete the synthesis mixture.

Stirring the synthesis mixture for about 15 minutes to about 24 hours, preferably 2 hours at room temperature, results in the formation of the synthesis gel.

The preferred molecular sieve composition may be formed by heating the gel in a microwave autoclave for a time ranging from about 6 hours to about 1 week, at a temperature ranging from about 150° C. to about 210° C., and at a pressure ranging from about 0 to about 40 Bar in order to form the molecular sieve. In cases where other products, unreacted gel, or a mixture thereof is present at the conclusion of the reaction, the molecular sieve may be recovered by a separation process such as centrifugation. The process may also include conventional product washing and drying such as an ethanol rinse, followed by a de-ionized water rinse, followed by air oven drying at a temperature ranging from about 40° C. to about 110° C. It should be noted that conventional heating may be substituted for microwave heating in this process, and that a substantially pure molecular sieve composition having the AEL-structure will result with either heating method. Stoichiometries for some of the gels exemplified herein are set forth in Table 2.

B. Preferred AEL-Type Molecular Sieve Catalysts

Preferred molecular sieve materials prepared in accordance with these methods are useful as catalytic materials. While not wishing to be bound, it is believed that the silicon distribution within the molecular sieve crystal, as measured for example by $^{29}$Si NMR, is one important characteristic influencing catalytic activity in SAPO materials. Since silicon is responsible for the acidity in SAPO materials, it is desirable that silicon be well dispersed in the aluminophosphate framework for high catalytic activity. It is known that silicon can form large silicon islands in SAPO materials. Although large silicon islands are undesirable because those silicon atoms at the interior of the islands are catalytically inactive, the small silicon-rich regions present in the preferred molecular sieve material are desirable because the strongest acid sites are believed to form at the borders of the Si-rich regions and the aluminophosphate domains. This is because those silicons at the borders have fewer aluminum atoms as nearest neighbors, which leads to decreasing acidity resulting from aluminum's lower electronegativity. The preferred AEL-type SAPO materials are believed to possess their desirable catalytic activity and selectivity because the Si atoms are well dispersed within the molecular sieve framework.

As is known to those skilled in the art, molecular sieve materials may possess an intrinsic or added catalytic functionality, and such materials are frequently referred to as "molecular sieve catalysts." Additional catalytic functionalities may be provided for molecular sieve materials by conventional methods. Such methods are applicable to the molecular sieves of this invention, and may be summarized as follows.

Accordingly, the molecular sieve material formed from the gel as set forth above may be calcined to remove the template. The sample may then be allowed to cool, preferably in a dry environment., and then loaded with an additional catalytic functionality such as Pt, if desired. For example, Pt may be incorporated in an amount ranging about 0.01% to about 20%. It may be incorporated by incipient wetness impregnation starting with an aqueous solution of hexachloroplatinic acid. Such solutions include HCl in a range of concentration between 2N to 0.01N. The impregnated sample may be dried and then calcined at temperatures ranging from about 400° C. to about 600° C. The Pt may subsequently be reduced "in situ" with flowing hydrogen, at a temperature ranging from about 400° C. to about 500° C., before the reaction.

C. Structural Analysis of Preferred AEL-Type Molecular Sieve Catalysts

The SAPO molecular sieve compositions useful in this invention have a Si content ranging from about 4 molar percent to about 10 molar percent silicon content based on the total amount of silicon in the molecular sieve composition. Preferably, the proportion between silicon atoms having one, two or three silicon atoms as nearest neighbors to those having four silicon atoms should be balanced, so that two conditions are simultaneously fulfilled: the molar ratio between (Si2Si+Si3Si) to Si4Si should be in the range of about 0.7 to about 1.4, and the sum of Si atoms with 2Si, 3Si and 4Si nearest neighbors should be in the range of about 10 to about 80 molar % based on the total amount of silicon in the molecular sieve's framework. As is known by those skilled in the art, the molar percent of Si atoms with one, two, three, and four Si atom nearest neighbors may be obtained, for example, by deconvoluting the integrated intensities from $^{29}$Si NMR measurements, as illustrated in FIG. 2 and Table 1. Table 1 gives the mole fraction of framework silicon in each type of silicon site for samples 1a through 1d and 2a and 2b from the examples.

TABLE 1

| Si Environment Chemical Shift in ppm from TMS | 4A1, 0Si −89 to −91 ppm | 3A1, 1Si −97 ppm | 2A1, 2Si −103 ppm | 1A1, 3Si −108 ppm | 0A1, 4Si −110 to −113 ppm |
|---|---|---|---|---|---|
| EXAMPLE | | | | | |
| 1a | 17.5 | 9.7 | 4.4 | 1.2 | 67.2 |
| 1b | 4.6 | 34.3 | 6.4 | 7.3 | 47.4 |
| 1c | 4.4 | 13.9 | 8.9 | 8.5 | 64.3 |
| 1d | 1 | 17.0 | 15.1 | 10.4 | 56.5 |
| 2a | 15.5 | 28.9 | 14.3 | 13.9 | 27.4 |
| 2b | 5.4 | 25.3 | 19.7 | 18.2 | 31.4 |

D. Use of New AEL-Type Molecular Sieves as Catalysts

The molecular sieves of this invention are useful as catalysts in a number of applications including, but not limited to, catalytic dewaxing, isodewaxing/isomerization, hydrocracking, alkylation of aromatic hydrocarbons (e.g., benzene) with long chain olefins (e.g., $C_{14}$ olefin), alkylation of aromatic hydrocarbons (e.g., benzene and alkylbenzenes) in presence of an alkylating agent (e.g., olefins, formaldehyde, alkyl halides and alcohols having 1 to about 20 carbons atoms), alkylation of aromatic hydrocarbons (e.g., benzene) with light olefins to produce short chain aromatic compounds (e.g., alkylation of benzene with propylene to give cumene), transalkylation of aromatic hydrocarbons in the presence of polyalkylaromatic hydrocarbons, isomerization of aromatic feedstock components (e.g., xylene), naphtha cracking to make olefins, oligomerization of straight and branched chain olefins having from about 2 to 5 carbons atoms, disproportionation of aromatics (e.g., the disproportionation of toluene to make benzene and paraxylene), and conversion of naphtha (e.g., $C_6$–$C_{10}$) and similar mixtures to highly aromatic mixtures.

For example, isodewaxing involves the conversion of high boiling feedstocks boiling in the lubricating oil range to lower boiling products primarily by isomerization. Thus long chain normal and slightly branched paraffins are converted to iso-paraffins while minimizing the amount of cracking to products boiling outside the lube oil range.

Feedstocks to the isodewaxing process include distillates, raffinates, synthetics such as Fischer-Tropsch feeds, deasphalted oils, and solvent dewaxed oils, said feeds boiling in the range 177 to 650° C., preferably 200 to 540° C., which may be either hydroprocessed or non-hydroprocessed and may have wax contents from 0 to 100%.

The feedstocks are contacted with the preferred molecular sieve in the presence of hydrogen gas at a temperature of 250° C. to 430° C., preferably 280° C. to 400° C., a hydrogen pressure of 400 to 3000 psig, preferably 600 to 2500 psig, a liquid hourly space velocity of 0.1 to 30 v/v/h, preferably 0.3 to 7 v/v/h, and a hydrogen gas treat rate of 400 to 10,000 scf/b, preferably 1000 to 5000 scf/b.

The catalyst will be loaded with a hydrogenation component which is at least one metal chosen from Groups VIII, VIB and IB, preferably Group VIII noble metals, especially Pt or Pd or combinations of both. The amount of metal will be from 0.1 to 20 wt. % based on catalyst, preferably 0.15 to 5 wt. %. The catalyst may also contain an inorganic oxide binder such as alumina, silica—alumina, zirconia, silica, silica—magnesia, titania and the like.

Hydrocracking includes both conventional hydrocracking and selective hydrocracking. In conventional hydrocracking, the feedstock is cracked in the presence of an acidic catalyst such as silica-alumina or a large pore zeolite under hydrocracking conditions. The acidic catalyst may be combined with the molecular sieves of this invention in the hydrocracking zone. The addition of the molecular sieve influences the product distribution obtained on hydrocracking. For example, by combining molecular sieve with a conventional hydrocracking catalyst, one can modify the product slate to favor gasoline containing a higher percentage of isoparaffins.

In conventional hydrocracking, the feedstocks are contacted with a hydrocracking catalyst and the molecular sieve catalyst of this invention in the presence of hydrogen gas at a temperature of 250 to 430° C., preferably 280 to 400° C., a hydrogen pressure of 400 to 3000 psig, preferably 600 to 2500 psig, a liquid hourly space velocity of 0.1 to 30 v/v/h, preferably 0.3 to 7 v/v/h, and a hydrogen gas treat rate of 400 to 10,000 scf/b, preferably 1000 to 5,000 scf/b.

Another process for catalytic dewaxing is to combine the molecular sieve of this invention with a conventional dewaxing catalyst. This combines the isomerization and selective hydrocracking functions to control the pour point and viscosity index of the product. Catalytic hydrodewaxing catalysts are typically intermediate pore zeolites such as ZSM-5, ZSM-22, ZSM-23, ferrierite, ZSM-35 and the like. The catalysts may be in a layered configuration or may be staged in separate reactors. It is preferred to have the feedstock contact the molecular sieve initially followed the hydrodewaxing catalyst, although the reverse may be used if desired.

Dewaxing conditions include a temperature of 250 to 430° C., preferably 280 to 400° C., a hydrogen pressure of 400 to 3000 psig, preferably 600 to 2500, a liquid hourly space velocity of 0.1 to 30 v/v/h, preferably 0.3 to 7 v/v/h, and a hydrogen gas treat rate of 400 to 10,000 scf/b, preferably 1000 to 5,000 scf/b.

Either or both catalytic components may contain a hydrogenation component which is at least one metal chosen from Groups VIII, VIB, IB, preferably Group VIII noble metals, especially Pt or Pd or combinations of both. The catalyst may include an inorganic oxide binder such as clays, silica, silica-alumina, alumina, zirconia, silica-magnesia, titania, silica-titania, silica zirconia, alumina-titania and the like.

In summary, it has been discovered that when AEL-type molecular sieves are synthesized in accord with the methods of this invention and following the procedure described herein, that the distribution of Si and therefore the total number and strength of acid sites is quite different, and much higher, than those of conventional SAPO-11. It has also been discovered that the molecular sieves of this invention are extremely active and selective for carrying out FCC reactions for naphtha and light olefin production as well as for lubricating oil hydroprocessing.

The invention is further exemplified by the following non-limiting examples.

EXAMPLES

Example 1

Preparation of a Conventional Sample of SAPO-11

A sample of conventional SAPO-11 was prepared in accordance with the procedure set forth in Zubowa et al; *J.* *Chem. Soc. Faraday Trans* 86, 2307 (1990). More specifically the synthesis used was as follows:

$H_3PO_4$ (Riedel-de-Haën, 85%) was agitated during 10–15 minutes with the required amount of $H_2O$ (Milli Q). On this solution the pseudobohemite (Catapal B, 73.7% $Al_2O_3$) was added and the mixture was agitated for two hours. Dipropylamine (DPA, Aldrich) and Ludox AS40 (Aldrich 40%) were then added successively. After two more hours of agitation, the preparation of the gel was concluded. Gels prepared in accord with this process have stoichiometries in the range of

$$xAl_2O_3: P_2O_5: yDPA: 0.6SiO_2:62H_2O,$$

wherein x is ranges from about 1 to about 1.2, y ranges between about 1 and about 2.5, and Z ranges between about 0 and about 1.5. More specifically, the sample prepared in this example was

$$Al_2O_3: P_2O_5: DPA: 0.6SiO_2: 62H_2O.$$

The gel was introduced in 60 ml Teflon-lined autoclaves, which were about 50% filled up, and was crystallized at 195° C. for about 16 hours. The crystallized products were washed and centrifuged 3 times at 14.000 rpm. The resultant solid was dried at 100° C.

The samples were calcined in accordance with the following program:
(a) Flow of $N_2$(150 ml.min$^{-1}$), at 2° C. min$^{-1}$ until reaching 550° C.
(b) At 550° C. are kept under the $N_2$ flow during 1 hour.
(c) $N_2$ is changed to air (150 ml.min$^{-1}$) and kept at 550° during 3 hours.
(d) The system is let to cool down under the flow of air.
(e) During the calcination procedure the height of the bed was 0.5 cm.

Figure 4:
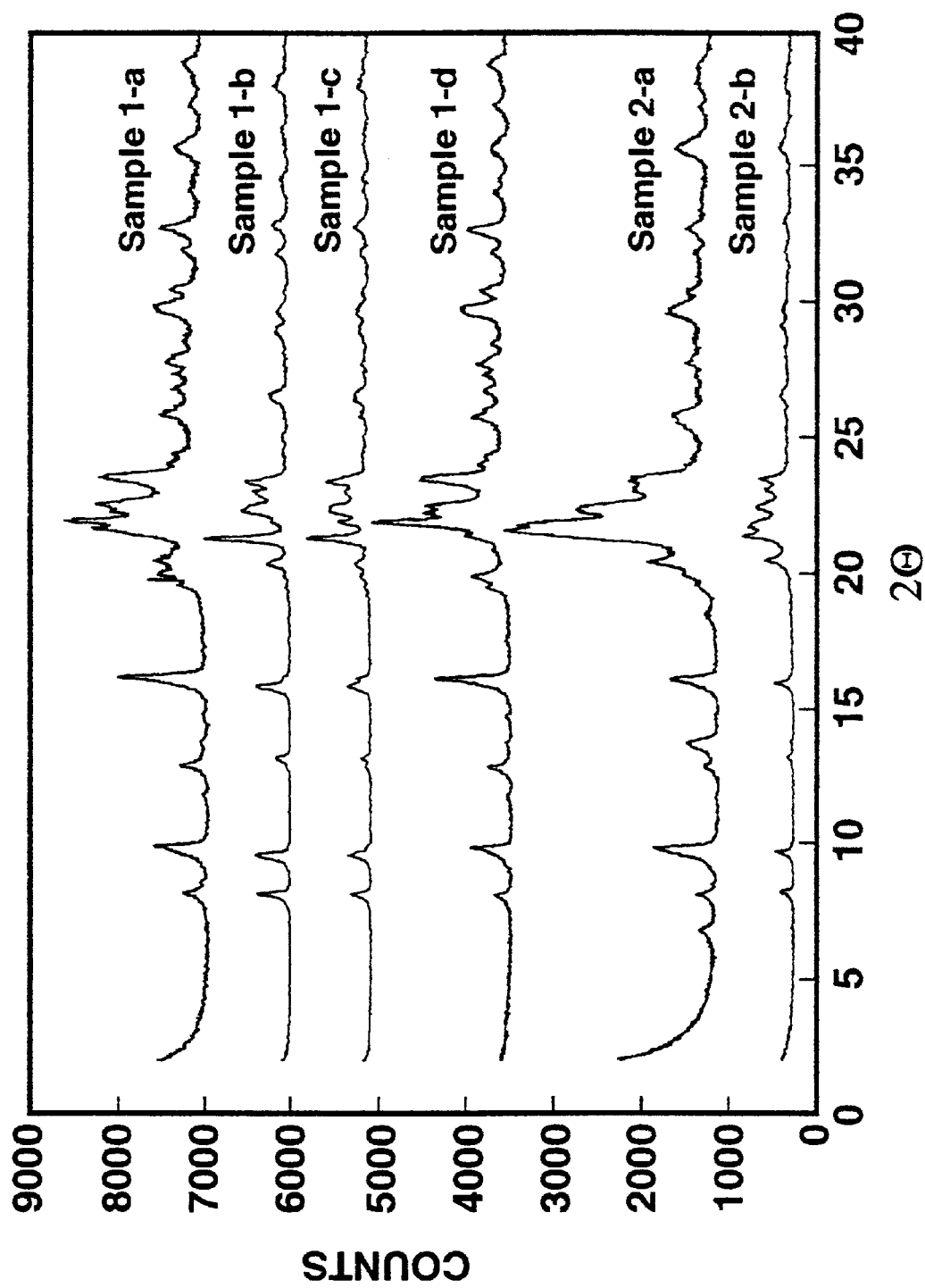
FIG. 4 shows power x-ray diffraction results for the samples described herein.

The powder x-ray diffraction pattern for these samples, shown in FIG. 4(*a*), demonstrates that a substantially pure SAPO-11 resulted. The sample is designated herein as Sample 1-a.

Sample 1-a was further characterized using $^{29}$Si MAS NMR spectroscopy and the data generated is shown on FIG. 5-*a*. This solid state $^{29}$Si MAS NMR spectrum and all others appearing hereafter were recorded on a Varian VXR S 400 WB spectrometer at 79.5 MHz using 7 mm CP/MAS Varian probe with zirconia rotors. To acquire the spectra, pulses of 4.2 μs corresponding to π/3 rad pulse length were applied, with a 40s recycle delay and a rotor spinning rate of 5 KHz.

Three additional samples of conventional SAPO-11 were prepared in accordance with the procedure set forth in U.S. Pat. No. 4,440,871. Accordingly, Al isopropoxide was introduced into a polypropylene flask, which was provided with a tope for passage of a stirrer. A solution of $H_3PO_4$ was prepared with the total amount of water (milli Q) required for the synthesis. The $H_3PO_4$ solution was added to the polypropylene flask, located in a $H_2O$ bath at 20±2° C. The mixture was stirred during 2 hours using a teflon stirrer at 350 rpm.

After two hours time, the stirring was stopped and the necessary silica was added from LUDOX AS40, and the mixture was stirred for 2 hours. Finally, the DPA was added and the synthesis mixture was stirred for 2 hours to form the synthesis gel. The gel prepared in this way is white, and had the Ph as given in Table 2.

The general composition of the gel was

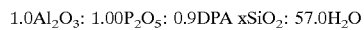
$$1.0Al_2O_3: 1.00P_2O_5: 0.9DPA \, xSiO_2: 57.0H_2O$$

The gel composition and the yield of the solid product obtained are also given in Table 2.

The gel was distributed among 6 teflon-lined autoclaves of 60 ml of capacity each (40 g of synthesis gel in each autoclave), and the crystallization was conducted in static mixing at 195° C. for 48 hours. After this, the product of each autoclave was washed with 240 ml of $H_2O$ and centrifuged. Four solid samples of SAPO-11 were dried at 40° C., and are designated herein as Samples 1-a, 1-b, 1-c, and 1-d Powder x-ray diffraction patterns for the samples, shown respectively in FIGS. 4a, 4b, 4c and 4d, demonstrate that a substantially pure SAPO-11 resulted.

$^{29}$Si MAS NMR results from samples 1-a, 1-b, 1-c, and 1-d are set forth respectively in FIGS. 5a, 5b, 5c, and 5d. As is evident from the spectra, all conventional SAPO-11 samples (FIG. 5a through 5d) show substantial silicon islanding as indicated by the number of silicon atoms in the framework having four silicon atom nearest neighbors.

material was calcined using the protocol as was used for sample 1-a. The resulting sample is referred to herein as sample 2-a.

The composition of the gel was $Al_2O_3$: $P_2O_5$: 0.3 TEOS: DPA: 0.144 Hexadecilamine: 4.40 Hex: 40 $H_2O$.

Powder x-ray diffraction data, shown in FIG. 4, demonstrates that the product is isostructural with SAPO-11. $^{29}$Si MAS NMR was used to characterize the local atomic environment of Si atoms in the SAPO framework. That data is shown in FIG. 5(e). As is clear from the data, Sample 2-a exhibits a greatly reduced amount of silicon islanding when compared to Samples 1-a through 1-d, for approximately the same amount of silicon in the synthesis solution.

A second SAPO sample was prepared from a surfactant-containing synthesis solution in order to investigate the degree of Si islanding at higher silica concentration.

TABLE 2

| EXAMPLE | $Al_2O_3$ | $P_2O_5$ | DPA | $SiO_2$ | CA | SOL | $H_2O$ | Yield (%)[1] | Si (wt) | $pH_i$[2] |
|---|---|---|---|---|---|---|---|---|---|---|
| 1a | 1.0 | 1.0 | 1.0 | 1.6 | 0 | 0 | 62 | 15 | 5.78 | 3.48 |
| 1b | 1.0 | 1.0 | 0.9 | 0.6 | 0 | 0 | 57 | 17 | 2.47 | 6.65 |
| 1c | 1.0 | 1.0 | 0.9 | 1.0 | 0 | 0 | 57 | 17 | 6.24 | 7.37 |
| 1d | 1.0 | 1.0 | 0.9 | 1.5 | 0 | 0 | 57 | 17 | 4.68 | 6.98 |
| 2a | 1.0 | 1.0 | 1.0 | 0.3 | 0.144 | 4.40 | 40 | 17 | 10.04 | 4.33 |
| 2b | 1.0 | 1.0 | 1.0 | 1.0 | 0.144 | 4.40 | 40 | 18 | 3.58 | 4.50 |

[1]Yield: (g. solid product/g.gel)*100
[2]pH of the synthesis gel

Example 2

Synthesis of a SAPO-11 Using a Surfactant-Containing Synthesis Solution 20.34 g of $Al_2O_3$ (Condea Pural SB 74.6%) were introduced in a 500 ml polypropylene flask, which was provided with a tope for passage of an agitator.

A solution of 34.31 g of $H_3PO_4$ (Riedel-de-Haën 85%), and 30 g of $H_2O$ (milli Q) was prepared by agitation during 10–15 minutes. The $H_3PO_4$ solution was added to the polypropylene flask, which was placed into a water bath at 20±2° C. The mixture was stirred during 2 hours with a Teflon stirrer, at 350 rpm. After this time the stirring was stopped and 15.21 g of DPA were added, and the mixture was stirred during 2 hours.

68–27 g of 1 hexanol (Aldrich 95%), 30 g of $H_2O$ and 5.75 g of hexadecilamine (Aldrich 99%) were combined in a glass flask, and the resultant solution was stirred during 1 hour.

The hexanol solution, together with 9.30 g of tetraethylorthosilicate (TEOS) (Merck-Schuchardt≦98%) and 26.81 g of $H_2O$ (milli Q) were added to the polypropylene flask, and the mixture was stirred during 2 hours in order to form the synthesis gel.

The resultant gel was white, and the pH was 4.33.

40 g of the synthesis gel were introduced in the 60 ml Teflon-lined autoclaves, and the crystallization was carried out at 195° C. in static mixing (without stirring) during 24 hours.

The resultant samples were washed first with 240 ml of $H_2O$, followed by 30 ml ethanol; and finally 240 ml of $H_2O$ while centrifuging. The yield was 0.17 g dried solid. $g^{-1}$ gel. A portion of the uncalcined SAPO-11 was enclosed. This Accordingly, a sample of SAPO-11 was synthesized using surfactants and with a higher Si content than any of the previously prepared samples. This sample was prepared according to the same synthesis procedure as sample 2-a, and the gel composition and solid yield is given in Table 2. FIG. 4 shows the powder XRD. This sample referred to as sample 2-b herein. The powder x-ray diffraction data reveals the presence of some tridimite impurities in sample 2-b. $^{29}$Si MAS NMR results show that sample 2-b has substantially fewer Si framework atoms in lattice sites having four Si nearest neighbors than does a conventionally-prepared SAPO-11 with about half the silicon content (FIG. 5-a).

Example 3

Acidity Measurements

The total amount of Bronsted and Lewis acid sites, as well as the acid strength distribution of all samples was determined by adsorption and thermal desorption of pyridine is accordance with known procedures. In this example, it is assumed that at 150° C. of pyridine desorption temperature all the acid sites are measured. While at 350° C. only the strongest acid sites will be able to retain pyridine.

IR spectroscopy was used to probe hydroxyl stretching modes in the samples before and after pyridine adsorbtion. Pyridine adsorbtion at Bronsted (1545 $cm^{-1}$) and Lewis (1455 $cm^{-1}$) acid sites are determined by calculating the integrated intensities of the IR absorbtion bands. The results are set forth in Table 3.

TABLE 3

| Example | Bronsted (micromole py/gr cat.) | | | Lewis (micromole py/gr cat.) | | |
|---|---|---|---|---|---|---|
| Number | 150° C. | 250° C. | 350° C. | 150° C. | 250° C. | 350° C. |
| 1-a | 12 | 6 | 0 | 6 | 4 | 2 |
| 1-b | 16 | 9 | 1 | 6 | 4 | 2 |
| 1-c | 13 | 8 | 1 | 5 | 3 | 1 |
| 1-d | 14 | 8 | 0 | 4 | 2 | 1 |
| 2-a | 14 | 13 | 2 | 5 | 6 | 3 |
| 2-b | 18 | 13 | 0 | 10 | 8 | 0 |

Table 3 shows that the sample synthesized with surfactant (2-a and 2-b) have a higher total Bronsted acidity than the conventionally synthesized samples. Importantly, sample 2-b has more Bronsted acid sites than do samples 1-b and 1-d with lower (sample 1-b) and higher (sample 1-d) Si content in the synthesis solution. These data are in agreement with the NMR data which shows increased proportion of Si—O—Al bonding which inherently means higher and stronger acidity.

Example 4

Catalytic Activity

Samples 1-a, 1-b, 1-c, 1-d, and 2-b were evaluated for use in the catalytic conversion of n-hexadecane. The samples were loaded with Pt (0.5 wt. %). It was incorporated by incipient wetness impregnation. Starting with an aqueous solution of hexachloroplatinic acid, the reactions conditions included 3.58 hours$^{-1}$ WHSV, a total pressure of 40 Bar, and an $H_2/nC_{16}$ mol ratio of 50.

Figure 6:
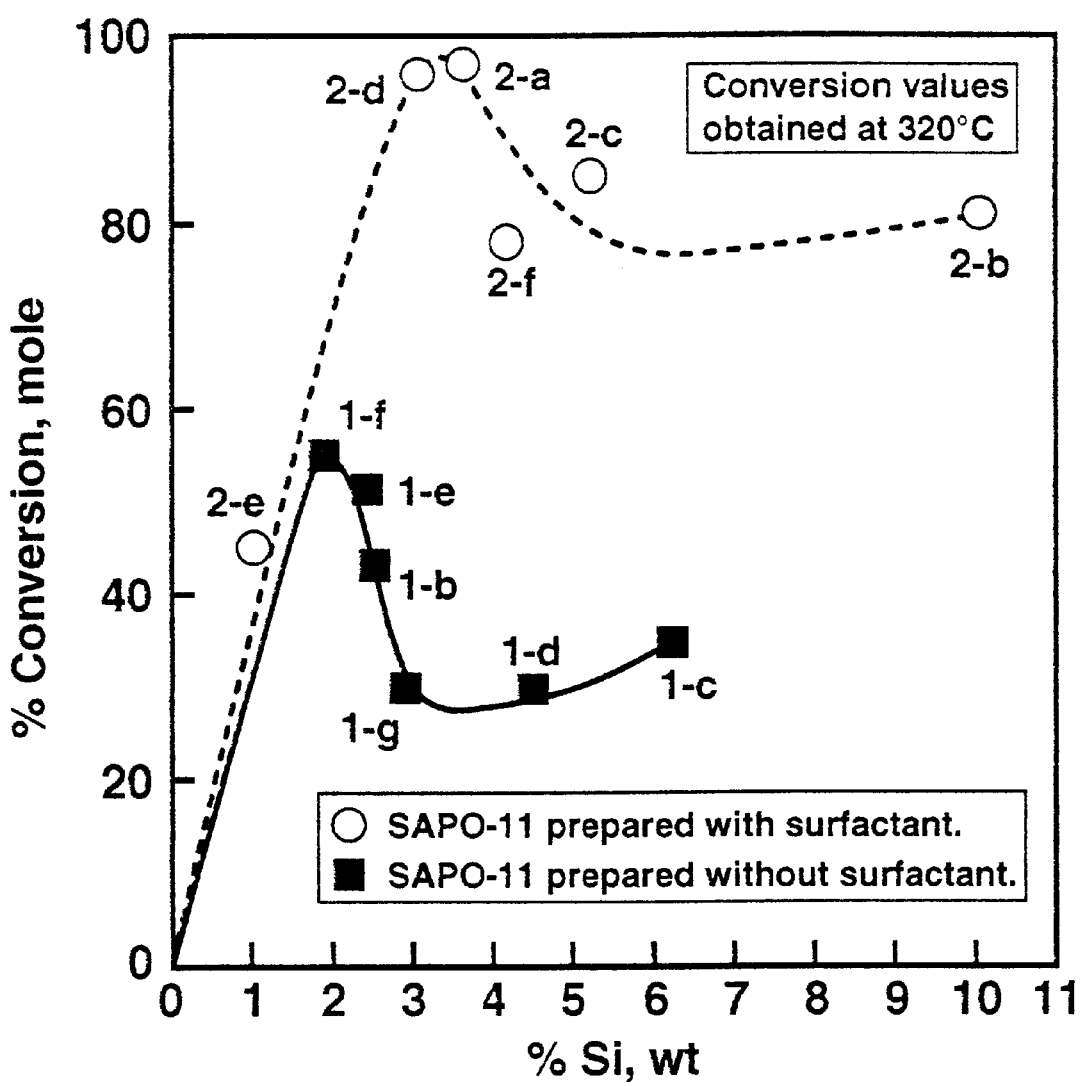
FIG. 6 shows the variation of n-hexane conversion catalytic activity with Si content for the samples described herein.

Table 4 shows that the surfactant-prepared SAPO of sample 2-b has a greater conversion activity at a much lower temperature than the conventionally prepared material, without an undesirably large decrease in selectivity. FIG. 6 shows that both conventionally-prepared and surfactant-prepared SAPO catalysts used for isomerization shows a maximum in activity between 2 and 4 wt. % Si. However, it is also clear that the series synthesized with surfactant gives much higher activity than those synthesized without surfactant, regardless of the Si content.

From the point of view of the selectivity to isomerization measured at 80% conversion (see FIG. 7), this goes through a maximum in the surfactant series for a Si content in the same range than above for the catalytic activity (2–4 wt. % Si). This maximum is less defined with the samples prepared without surfactant. Again it appears that, the maximum in the selectivity curve on the samples prepared with surfactant goes above any of the samples prepared using surfactant.

It can be then concluded that the samples prepared using surfactants are more active and selective isomerization catalysts.

In FIGS. 6 and 7, samples 1-e, 1-f, and 1-g are conventionally prepared SAPO catalysts.

Samples 2-c, 2-d, 2-e, and 2-f were prepared in accordance with the procedure set forth in example 2.

TABLE 4

| | % Temp. | % Conver. | % Isomer. | % Cracking | % Mono-Branched | % Di-Branched | % Tri-Branched | Isomerization selectivity (%) |
|---|---|---|---|---|---|---|---|---|
| Sample 1-a | 310 | 3.32 | 3.18 | 0.14 | 2.88 | 0.23 | 0.06 | 95.75 |
| | 362 | 35.47 | 31.55 | 3.92 | 26.74 | 4.36 | 0.46 | 88.94 |
| | 400 | 82.27 | 65.39 | 16.87 | 43.69 | 17.21 | 4.49 | 79.49 |
| | 415 | 93.63 | 70.57 | 23.06 | 35.89 | 24.23 | 10.45 | 75.37 |
| | 435 | 97.08 | 54.38 | 42.71 | 20.75 | 21.76 | 11.87 | 56.01 |
| Sample 1-b | 310 | 21.2 | 13.37 | 7.83 | 12.8 | 0.57 | 0 | 63.05 |
| | 323 | 50.64 | 28.92 | 21.73 | 25.09 | 3.83 | 0 | 57.1 |
| | 333 | 71.81 | 33.15 | 38.66 | 28.04 | 4.79 | 0.32 | 46.17 |
| | 341 | 85.85 | 40.72 | 45.13 | 32.18 | 7.82 | 0.72 | 47.43 |
| | 351 | 95.88 | 28.7 | 67.18 | 19.4 | 7.51 | 1.79 | 29.94 |
| Sample 1-c | 310 | 18.06 | 12.2 | 5.86 | 11.9 | 0.3 | 0 | 67.53 |
| | 336 | 61.15 | 39.92 | 21.23 | 34.27 | 5.44 | 0.21 | 65.28 |
| | 344 | 74.45 | 44.2 | 30.24 | 37.58 | 6.4 | 0.22 | 59.38 |
| | 350 | 87.73 | 48.47 | 36.26 | 37.22 | 10.1 | 1.14 | 57.21 |
| | 366 | 93.09 | 38.29 | 54.8 | 24.59 | 11.18 | 2.52 | 41.13 |
| Sample 1-d | 300 | 6.95 | 5.97 | 0.99 | 5.97 | 0 | 0 | 85.82 |
| | 318 | 25.76 | 20.03 | 5.72 | 18.82 | 1.22 | 0 | 77.78 |
| | 340 | 60.89 | 42.6 | 18.59 | 37.26 | 4.15 | 0.89 | 69.47 |
| | 348 | 84.26 | 55.66 | 28.6 | 42.09 | 12.35 | 1.23 | 66.06 |
| | 356 | 92.85 | 47.95 | 44.9 | 31.6 | 13.57 | 2.78 | 51.64 |
| Sample 2-a | 300 | 31.63 | 26.5 | 5.12 | 22.78 | 2.95 | 0.77 | 83.8 |
| | 310 | 47.64 | 43.14 | 4.5 | 30.78 | 10.9 | 1.46 | 90.56 |
| | 330 | 70.85 | 60.65 | 10.2 | 35.03 | 18.98 | 6.63 | 85.6 |
| | 340 | 83.92 | 76.03 | 7.89 | 35.53 | 26.54 | 13.97 | 90.6 |
| Sample2-b | 280 | 24.83 | 17.83 | 6.7 | 15.95 | 1.87 | 0 | 72.68 |
| | 301 | 56.34 | 30.31 | 26.02 | 18.91 | 9.36 | 2.05 | 53.71 |
| | 316 | 71.44 | 33.75 | 37.68 | 19.77 | 11.5 | 2.48 | 47.25 |
| | 320 | 81.44 | 37.14 | 44.3 | 20.66 | 12.74 | 3.74 | 45.6 |
| | 325 | 89.28 | 29.94 | 59.34 | 15.37 | 10.96 | 3.6 | 33.53 |

Example 5.

Dewaxing a Hydrocracker Distillate

TABLE 5

Properties of Hydrocracker Distillate

| | |
|---|---|
| Viscosity, cSt at 100° C. | 3.765 |
| Viscosity, cSt at 60° C. | 8.941 |
| VI | 119 |
| Wax Content, wt. % | 22.4 |
| Boiling Range, (5/95%), ° C. | 325–475 |
| Pour point, ° C. | 34 |

A sample of preferred SAPO-11 prepared according to this invention was loaded with 0.5 wt. % Pt using platinum tetraamine dinitrate before being intermixed in a 3:1 wt ratio with alumina which had been independently loaded with 0.5 wt. % Pt.

This catalyst was then used to hydrodewax the hydrocracker distillate in Table 5 under the conditions shown in Table 6. Table 6 also shows the properties of the products from the test as a function of Average Reactor Temperature and illustrates the ability of this catalyst for lubricant hydrodewaxing versus solvent dewaxing.

TABLE 6

| Catalyst (wt. %) | A Solvent Dewaxing | 0.5 wt. % Pt on Preferred SAPO-11/ 0.5 wt. % Pt alumina (3:1 wt ratio) | | |
|---|---|---|---|---|
| Conditions | Avg. Reactor Temperature, ° C. | 324 | 334 | 344 |
| | Pressure, psig | | 1000 | |
| | v/v/h | | 1.0 | |
| | T G Rate, scf/B | | 2500 | |
| Product Properties | | | | |
| 350° C. + ,Yield | 81.4 | 92.9 | 94.1 | 89.9 |
| Viscosity, cSt at 100° C. | 3.845 | 3.844 | 3.817 | 3.822 |
| Viscosity, cSt at 40° C. | 17.829 | 17.198 | 16.51 | 17.241 |
| VI | 107 | 116 | 117 | 113 |
| Pour Point, ° C. | −21 | 3 | −4 | −17 |
| Cloud Point, ° C. | | 11 | 2 | −11 |

What is claimed is:

1. A hydroprocessing method comprising: contacting a hydrocarbon under hydroprocessing conditions with a catalytically effective amount of a SAPO catalyst, the SAPO catalyst having a total silicon amount ranging from about 0.2 molar % to about 40 molar %, a total aluminum amount ranging from about 30 molar % to about 49.9 molar %, and a total phosphorus amount ranging from about 10 molar % to about 49.9 molar %, the molar percents being based on the total amount of aluminum, phosphorus, and silicon present in the composition, and the SAPO catalyst being isostructural with a SAPO-11 having the AEL structure and containing silicon, aluminum, and phosphorus, wherein
    (a) the silicon present in the SAPO catalyst and the SAPO-11 is distributed among silicon sites, each site having a first, a second, a third, and a fourth nearest neighbor position, and each position being independently occupied by one atom selected from silicon and aluminum, and
    (b) the composition has a first number of silicon sites having silicon atoms in the four nearest neighbor positions (Si4Si), a second number of silicon sites having silicon atoms in three of the four nearest neighbor positions (Si3Si), and a third number of silicon sites having silicon atoms in two of the four nearest neighbor positions (Si2Si), wherein
        (i) the sum of the first, second, and third number of silicon sites ranges from about10 to about80 molar %, and
        (ii) the molar ratio of the sum of the third and second number of silicon sites to the first number of silicon sites ranges from about 0.7 to about 1.4, the molar % being based on the total number of silicon sites.

2. The method of claim 1 wherein the hydrocarbon is at least one of distillate, raffinate, synthetic hydrocarbon, deashphalted oil, and solvent dewaxed oil.

3. The method of claim 2 wherein the contacting occurs in the presence of hydrogen at a temperature of 250° C. to 430° C., a hydrogen pressure of 400 to 3000 psig, a liquid hourly space velocity of 0.1 to 30 v/v/h, and a hydrogen gas treat rate of 400 to 10,000 scf/b.

4. The method of claim 3 wherein the contacting occurs at a temperature of 280° C. to 400° C., a hydrogen pressure of 600 to 2500 psig, a liquid hourly space velocity of 0.3 to 7 v/v/h, and a hydrogen gas treat rate of 1000 to 5000 scf/b.

5. The method of claim 4 wherein the catalyst is loaded with at least one metal chosen from Groups VIII, VIB and IB.

6. The method of claim 5 wherein the amount of metal ranges from 0.1 to 20 wt. % based on the weight of the catalyst.

7. The method of claim 6 wherein the hydroprocessing conditions are isodewaxing conditions.

8. The method of claim 7 further comprising forming an isodewaxed product having a second viscosity index, the hydrocarbon having a first viscosity index, wherein the second viscosity index is substantially the same as the first viscosity index.

9. A method for isodewaxing a hydrocarbon having a viscosity index without substantially changing the hydrocarbon's viscosity index, the method comprising:
    contacting the hydrocarbon under catalytic isodewaxing conditions with a catalytically effective amount of a SAPO catalyst, the SAPO catalyst having a total silicon amount ranging from about 0.2 molar % to about 40 molar %, a total aluminum amount ranging from about 30 molar % to about 49.9 molar %, and a total phosphorus amount ranging from about 10 molar % to about 49.9 molar %, the molar percents being based on the total amount of aluminum, phosphorus, and silicon present in the composition, and the SAPO catalyst being isostructural with a SAPO-11 having the AEL structure and containing silicon, aluminum, and phosphorus, wherein
    (a) the silicon present in the SAPO catalyst and the SAPO-11 is distributed among silicon sites, each site having a first, a second, a third, and a fourth nearest neighbor position, and each position being independently occupied by one atom selected from silicon and aluminum, and
    (b) the composition has a first number of silicon sites having silicon atoms in the four nearest neighbor positions (Si4Si), a second number of silicon sites having silicon atoms in three of the four nearest neighbor positions (Si3Si), and a third number of silicon sites having silicon atoms in two of the four nearest neighbor positions (Si2Si), wherein
        (i) the sum of the first, second, and third number of silicon sites ranges from about 10 to about 80 molar %, and (ii) the molar ratio of the sum of the third and second number of silicon sites to the first number of silicon sites ranges from about 0.7 to about 1.4, the molar % being based on the total number of silicon sites.

10. The method of claim 9 further comprising forming the catalyst from a silicoaluminophosphate gel having the formula

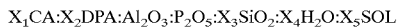

wherein $X_1$ ranges from about 0.001 to about 0.5, $X_2$ ranges from about 0.5 to 2, $X_3$ ranges from about 0.01 to about 3, $X_4$ ranges from about 4 to about 300, and $X_5$ ranges from about 0.1 to about 50, and CA is a surfactant selected from the group consisting of hexadecylamaine and decylamine, DPA is a template selected from the group consisting of di-n-propylamine, diisopropylamine, dodecylamine, and tetrabutylammonium hydroxide, and SOL is a solvent selected from the group consisitng of hexanol, pentanol or butanol.

11. The method of claim 10 wherein the silica source is selected from the group consisting tetraethyl orthosilicate, tetramethyl orthosilicate, and tetrabuthyl orthosilicate.

12. The method of claim 11 wherein the total silicon amount ranges from about 4 molar % to about 10 molar %.

13. The method of claim 12 further comprising forming the gel by combining a mixture of the $Al_2O_3$, $H_3PO_4$, and the template and then adding the alcohol and then the silica source.

14. The method of claim 13 further comprising heating the gel at a temperature ranging from about 150° C. to about 210° C. and a pressure ranging from about 0 to about 40 Bar.

15. The method of claim 14 wherein the hydrocarbon is at least one of distillate, raffinate, synthetic hydrocarbon, deashphalted oil, and solvent dewaxed oil.

16. The method of claim 15 wherein the contacting occurs in the presence of hydrogen at a temperature of 250° C. to 430° C., a hydrogen pressure of 400 to 3000 psig, a liquid hourly space velocity of 0.1 to 30 v/v/h, and a hydrogen gas treat rate of 400 to 10,000 scf/b.

17. The method of claim 16 wherein the contacting occurs at a temperature of 280° C. to 400° C., a hydrogen pressure of 600 to 2500 psig, a liquid hourly space velocity of 0.3 to 7 v/v/h, and a hydrogen gas treat rate of 1000 to 5000 scf/b.

18. The method of claim 17 wherein the catalyst is loaded with at least one metal chosen from Groups VIII, VIB and IB.

19. The method of claim 18 wherein the amount of metal ranges from 0.1 to 20 wt. % based on the weight of the catalyst.

20. The method of claim 19 wherein the total silicon amount ranges from about 7 molar % to about 10 molar %.

21. The method of claim 20 wherein the metal is at least one of platinum and palladium.

22. The method of claim 21 wherein the SAPO catalyst contains an inorganic oxide binder selected from the group consisitng of alumina, silica-alumina, zirconia, silica, silica-magnesia, titania.

* * * * *